(12) United States Patent
Coeck et al.

(10) Patent No.: US 11,426,930 B2
(45) Date of Patent: Aug. 30, 2022

(54) CALIBRATION METHOD FOR POWDER FUSION SYSTEM

(71) Applicant: LayerWise NV, Leuven (BE)

(72) Inventors: Sam Coeck, Vertrijk (BE); Jan Plas, Wilsele (BE); Nachiketa Ray, Leuven (BE); Brawley Valkenborgs, Kessel-lo (BE)

(73) Assignee: LayerWise NV, Leuven (BE)

( * ) Notice: Subject to any disclaimer, the term of this patent is extended or adjusted under 35 U.S.C. 154(b) by 152 days.

(21) Appl. No.: 17/025,240

(22) Filed: Sep. 18, 2020

(65) Prior Publication Data

US 2021/0086440 A1 Mar. 25, 2021

(30) Foreign Application Priority Data

Sep. 19, 2019 (EP) .................................. 19198320.4

(51) Int. Cl.
*B29C 64/153* (2017.01)
*B29C 64/393* (2017.01)
(Continued)

(52) U.S. Cl.
CPC ............ *B29C 64/153* (2017.08); *B22F 10/31* (2021.01); *B23K 26/082* (2015.10); *B29C 64/205* (2017.08); *B29C 64/232* (2017.08); *B29C 64/236* (2017.08); *B29C 64/245* (2017.08); *B29C 64/25* (2017.08); *B29C 64/259* (2017.08);
(Continued)

(58) Field of Classification Search
CPC ... B29C 64/393; B29C 64/386; B29C 64/153; B29C 64/268; B29C 64/259; B33Y 50/02; B33Y 50/00; B22F 10/31; G05B 19/401; G05B 19/4015; G05B 2219/37067; G05B 2219/37555
See application file for complete search history.

(56) References Cited

U.S. PATENT DOCUMENTS 5,832,415 A * 11/1998 Wilkening ............. G02B 26/10
   702/86
6,483,596 B1 * 11/2002 Philippi ................. B33Y 50/00
   356/615

(Continued)

FOREIGN PATENT DOCUMENTS

DE    102017219559 A1    5/2019
WO    2015040185 A1    3/2015
(Continued)

OTHER PUBLICATIONS

European Patent Office, "Extended European Search Report for European Patent Application No. 19198320.4", dated Mar. 24, 2020, 10 pages.

*Primary Examiner* — Atul P. Khare

(57) ABSTRACT

A manufacturing system for fabricating a three-dimensional article includes a housing, a sensor within the housing, a coater, a removable powder module (RPM) with a platen, a laser system, and a controller. A method of operating the manufacturing system includes installing the RPM into the housing, forming pillars onto the platen, positioning the top surfaces of the pillars a distance D below a build plane, installing a calibration plate onto the top surfaces of the pillars, and then calibrating the laser system using the sensor. The sensor can include one or more of an optical sensor and an acoustic sensor.

16 Claims, 6 Drawing Sheets

(51) Int. Cl.
*B23K 26/082* (2014.01)
*B29C 64/259* (2017.01)
*B29C 64/232* (2017.01)
*B29C 64/245* (2017.01)
*B29C 64/236* (2017.01)
*B29C 64/268* (2017.01)
*B29C 64/205* (2017.01)
*B29C 64/25* (2017.01)
*B29C 64/371* (2017.01)
*B22F 10/31* (2021.01)
*B33Y 40/00* (2020.01)
*B29C 64/386* (2017.01)
*B29C 64/30* (2017.01)
*B33Y 50/00* (2015.01)
*G05B 19/401* (2006.01)
*B22F 12/90* (2021.01)
*B33Y 10/00* (2015.01)
*B33Y 30/00* (2015.01)
*B33Y 50/02* (2015.01)

(52) U.S. Cl.
CPC .......... *B29C 64/268* (2017.08); *B29C 64/30* (2017.08); *B29C 64/371* (2017.08); *B29C 64/386* (2017.08); *B29C 64/393* (2017.08); *B33Y 40/00* (2014.12); *B33Y 50/00* (2014.12); *G05B 19/4015* (2013.01); *B33Y 10/00* (2014.12); *B33Y 30/00* (2014.12); *B33Y 50/02* (2014.12); *G05B 2219/37067* (2013.01); *G05B 2219/37555* (2013.01)

(56) References Cited

U.S. PATENT DOCUMENTS

| | | | |
|---|---|---|---|
| 6,615,099 B1 * | 9/2003 | Muller | B23K 26/04 219/121.68 |
| 8,237,788 B2 * | 8/2012 | Cooper | B33Y 40/00 356/616 |
| 8,803,073 B2 * | 8/2014 | Philippi | B23K 26/083 250/252.1 |
| 9,993,976 B2 * | 6/2018 | Coeck | B29C 64/393 |
| 10,049,852 B2 * | 8/2018 | Mullen | H01J 37/244 |
| 10,112,260 B2 | 10/2018 | Crear et al. | |
| 2010/0176539 A1 | 7/2010 | Higashi et al. | |
| 2016/0184893 A1 | 6/2016 | Dave et al. | |
| 2017/0173689 A1 | 6/2017 | Okazaki et al. | |
| 2018/0308657 A1 | 10/2018 | Mullen et al. | |
| 2018/0326485 A1 | 11/2018 | Brown | |
| 2020/0050169 A1 * | 2/2020 | Petratschek | B33Y 50/02 |
| 2020/0215759 A1 * | 7/2020 | Roblin | B29C 64/264 |
| 2021/0016394 A1 * | 1/2021 | McCarthy | B23K 26/042 |
| 2021/0031445 A1 * | 2/2021 | Coeck | B29C 64/371 |

FOREIGN PATENT DOCUMENTS

| | | |
|---|---|---|
| WO | 2017085470 | 11/2016 |
| WO | 2017085470 | 5/2017 |
| WO | 2019059761 | 3/2019 |
| WO | 2019089323 | 5/2019 |
| WO | 2019089323 A1 | 5/2019 |

\* cited by examiner

CALIBRATION METHOD FOR POWDER FUSION SYSTEM

CROSS-REFERENCE TO RELATED APPLICATIONS

This application claims the benefit of priority through the Paris convention to European application 19198320.4 filed on Sep. 19, 2019. This prior application is incorporated herein by reference.

FIELD OF THE INVENTION

The present disclosure concerns an apparatus and method for a layer-by-layer fabrication of three dimensional (3D) articles utilizing powder materials. More particularly, the present disclosure concerns a method of calibrating a laser system used to consolidate layers of the powder materials.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused at a build plane using an energy beam such as a laser, electron, or particle beam. Higher productivity printers can utilize multiple energy beams. One challenge with these systems is calibration, particularly when there are mechanical manufacturing tolerances.

SUMMARY

Figure 1:
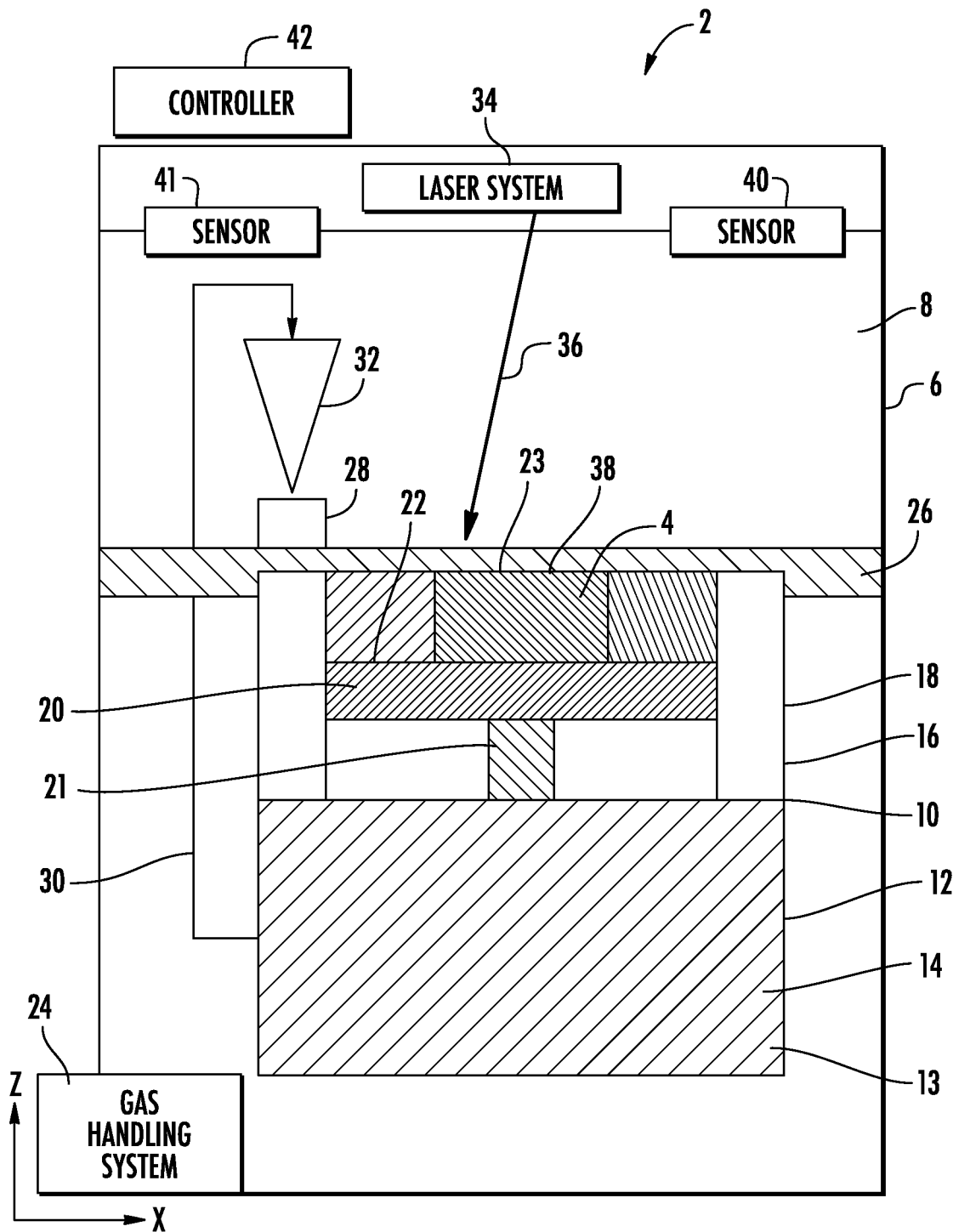
FIG. 1 is a schematic diagram of an embodiment of a manufacturing system for fabricating a three-dimensional article.

In a first aspect of the disclosure, a manufacturing system includes a housing, a coater, a vertical movement actuator coupled to a platen, and a laser system. A method of operating the manufacturing system includes (1) operating the vertical movement actuator, the coater, and the laser system to form at least three pillars onto an upper surface of the platen, the at least three pillars having upper surfaces that define a plane, (2) operating the vertical movement actuator to position the upper surfaces of the at least three pillars at a distance D below a build plane, (3) placing a calibration plate of thickness D on top of the upper surfaces of the at least three pillars, and (4) calibrating the laser system. Calibrating the laser system includes (a) operating the laser system to impact the upper surface of the calibration plate with a radiation beam, (b) operating a sensor concurrently with operating the laser system, (c) receiving a signal from the sensor, and (d) analyzing the signal to calibrate the laser system with respect to the build plane.

In one implementation the method further includes loading a removable powder module (RPM) into the housing. The RPM includes the platen and contains powder. The vertical movement actuator is coupled to the platen when the removable powder module is loaded into the housing.

Forming the pillars onto the platen before installing the calibration plate decouples calibration from the platen which is part of the RPM. That is because the coater defines the build plane based upon an upper surface of a layer of powder that the coater dispenses. This is important because installation of the RPM into the housing can introduce a varying height and orientation of the platen. But because the laser system is calibrated to the build plane, the calibration is independent of mechanical tolerances of installing the RPM.

In another implementation the manufacturing system includes a midplate and the method further includes mechanically aligning the laser system to the midplate and to the coater before calibrating the laser system. The midplate supports the coater.

In yet another implementation the pillars individually include a lower portion and an upper portion. The lower portion has a lower density in contact with the platen to facilitate removal from the platen. The upper portion defines the upper surface of the pillar. The lower portion can have a porosity of more than 20 percent, more than 25 percent, or about 30 percent. The upper portion can have a porosity of less than ten percent or less than five percent. The lower portion has a higher porosity to facilitate removal from the platen. The higher portion has a higher density so as to provide a better datum surface for supporting the calibration plate.

In a further implementation the method includes removing powder from above the platen before placing the calibration plate.

In a yet further implementation, the method includes evacuating the housing and backfilling the housing with argon before forming the at least three pillars.

In another implementation, calibrating the laser system is performed with ambient air in the housing.

In yet another implementation, the sensor is an optical sensor. The calibration plate includes fiducial marks. Analyzing the signal includes comparing estimated locations of the fiducial marks with scan coordinates of the fiducial marks.

In a further implementation, the sensor is an acoustic sensor.

Concurrently operating at least the laser system and the sensor includes concurrently vertically translating the calibration plate. Analyzing at least a signal from the sensor includes identifying peaks in an acoustic signal, analyzing the peaks to determine a focus height, comparing the focus height with a build plane height to provide an error, and adjusting the optics based upon the error so that the focus height better coincides with the build plane height.

In a second aspect of the disclosure, a manufacturing system for fabricating a three-dimensional article includes: (A) a housing defining a build chamber, (B) a sensor in the build chamber, (C) a coater that translates along an axis and configured to deposit a layer of powder having an upper powder surface defining a build plane, (D) a powder supply that is coupled to the coater, (E) a motorized platen having an upper platen surface, (F) a laser system, and (G) a controller configured to: (1) operate the motorized platen, the coater, and the laser system to form at least three pillars upon the upper platen surface, (2) operate the motorized platen to position top surfaces of the at least three pillars at a distance D below the build plane, (3) unlock the housing to allow a calibration plate of thickness D to be placed upon the top surfaces of the at least three pillars so that a top surface of the calibration plate is positioned at the build plane, (4) concurrently operate at least the laser system and the sensor, (5) analyze at least a signal from the sensor to calibrate the laser system.

In one implementation the controller is further configured to: before forming the at least three pillars, operating a gas handling system to evacuate the build chamber and then to backfill the build chamber with argon.

In another implementation, the controller is further configured to: after forming the at least three pillars, operating the gas handling system to fill the build chamber with ambient air.

In yet another implementation, the sensor is an optical sensor. The calibration plate includes a plurality of fiducials. Concurrently operating at least the laser system includes scanning a radiation beam emitted by the laser system over the fiducials. Analyzing at least a signal from the sensor includes comparing expected locations of the fiducials with scan coordinates of the fiducials.

In a further implementation, the sensor is an acoustic sensor. Concurrently operating at least the laser system and the sensor includes concurrently vertically translating the calibration plate. Analyzing at least a signal from the sensor includes identifying peaks in an acoustic signal, analyzing the peaks to determine a focus height, comparing the focus height with a build plane height to provide an error, and adjusting the optics based upon the error so that the focus height better coincides with the build plane height.

In a yet further implementation, the sensor includes two sensors including an optical sensor and an acoustic sensor. Analyzing at least a signal includes (1) calibrating the laser system along lateral axes X and Y at least partly as a result of analyzing a signal from the optical sensor and (2) calibrating the laser system along vertical axis Z at least partly as a result of analyzing a signal from the acoustic sensor.

DETAILED DESCRIPTION OF THE PREFERRED EMBODIMENTS

FIG. 1 is a schematic diagram of an embodiment of a manufacturing system 2 for fabricating a three-dimensional article 4 in a layer-by-layer manner. The system 2 includes an outer housing 6 that contains a process chamber 8. Within the housing 6 is a removable powder module (RPM) 10. A lower portion 12 of the RPM 10 contains a supply 13 of powder 14. An upper portion 16 of the RPM 10 includes a build vessel 18. Within the build vessel 18 is a motorized platen 20. Platen 20 has an upper surface 22 for supporting the three-dimensional article 4. Platen 20 is a motorized platen 20 because it is coupled to a vertical movement actuator 21 for controlling a vertical position of platen 20. The vertical movement actuator 21 is mechanically coupled to the platen 20 when the RPM is installed into the process chamber 8 of housing 6.

System 2 includes a gas handling system 24. Gas handling system 24 includes gas handling apparatus such as a vacuum pump for evacuating the process chamber 8. Gas handling system 24 also includes one or more gas supplies for backfilling process chamber 8 with inert gas such as argon.

System 2 includes a midplate 26 that supports a coater 28. In an embodiment, the midplate 26 includes rails (not shown) that support and guide the coater 28 along an X-axis. A powder transport 30 is configured to transport the powder 14 from supply 13 to a dispensing hopper 32. The dispensing hopper 32 is configured to recharge the coater 28 with powder as needed. In some embodiments, powder transport 30 includes one or more motorized augers for transporting the powder 14.

System 2 includes a laser system 34 configured to generate and scan a radiation beam 36 across a build plane 38. The build plane 38 is defined as an upper surface or top surface of a layer of powder 14 deposited by the coater 28 that is addressable by (can be fused by) the laser system 34. For accuracy and quality of fabrication, it is important that a focus of the radiation beams 36 coincides with the build plane 38.

System 2 includes sensors 40 and 41 that are utilized when calibrating the laser system 34. In an illustrative embodiment, sensor 40 is an optical sensor 40 that is sensitive to radiation reflected from the build plane 38. Optical sensor 40 outputs a signal or data stream that is indicative of a magnitude of received reflected radiation versus time. In an illustrative embodiment, sensor 41 is an acoustic sensor 41 that is sensitive to sound waves. Acoustic sensor 41 outputs a signal or data stream that is indicative of a magnitude of received sound oscillation amplitudes versus time.

A controller 42 is controllably coupled to the vertical movement actuator 21, gas handling system 24, coater 28, powder transport 30, dispensing hopper 32, laser system 34, sensors 40 and 41, and other portions of system 2. Controller 42 includes a processor coupled to a non-volatile or non-transient data storage. The data storage stores software instructions that, when executed by the processor, control, operate, and/or receive information from portions of the system 2.

The controller 42 is configured to operate portions of manufacturing system 2 to fabricate the three-dimensional article 4 with the following steps: (1) operate vertical movement actuator 21 to position the upper surface 22 of platen 20 proximate to the build plane 38. (2) Operate coater 28 to dispense a layer of powder 14 over the upper surface 22. The top surface of the layer of powder 28 defines the build plane 38. (3) Operate the laser system 34 to selectively fuse the layer of powder 14 to define a layer of the three-dimensional article 4. Steps (1)-(3) are repeated until the three-dimensional article 4 is fully formed. In some embodiments, the three-dimensional article 4 can be a test structure or can included more than one three-dimensional article 4. When step (2) is repeated, dispensing is upon a top surface 23 of the three-dimensional article 4.

Figure 2:
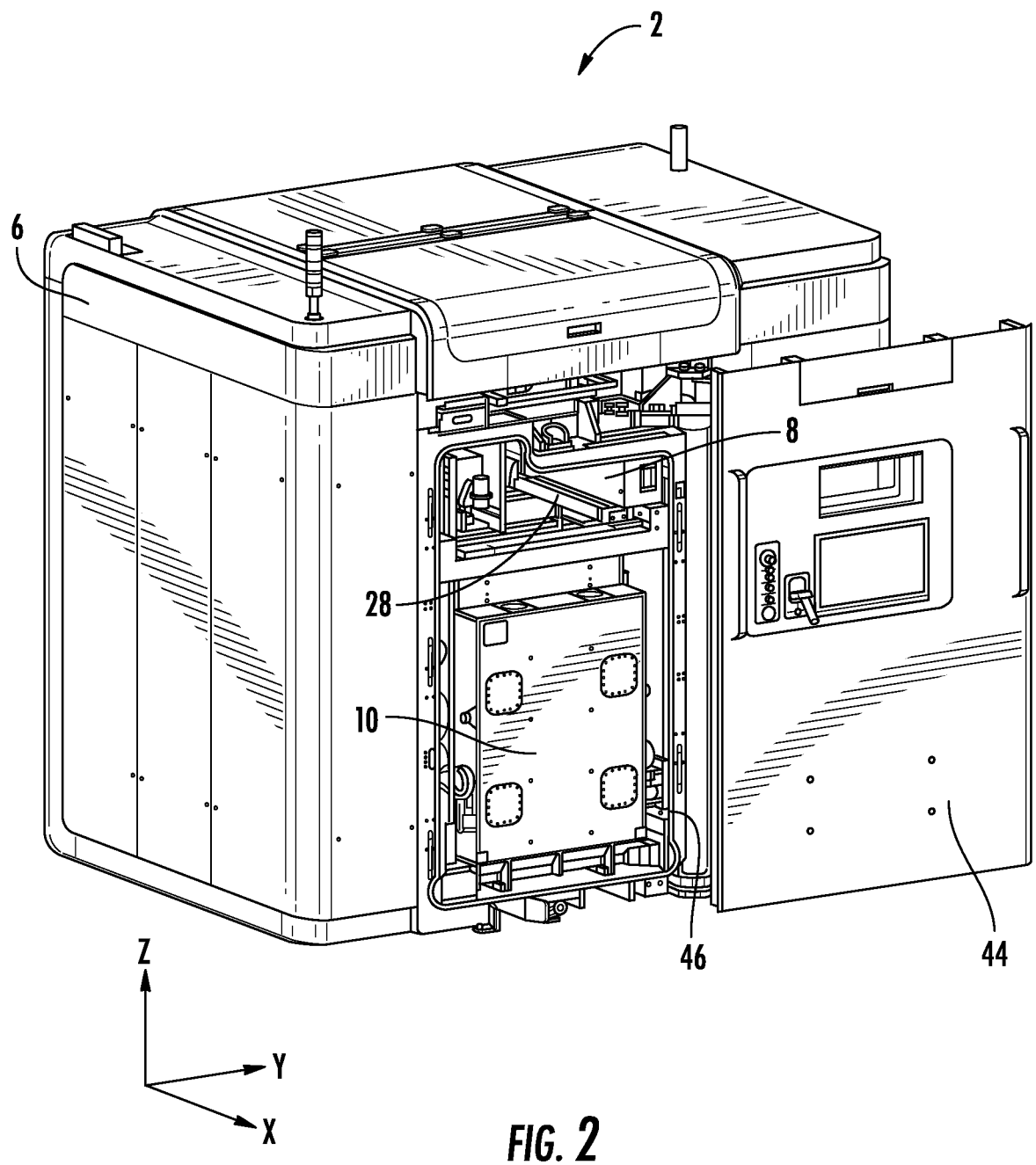
FIG. 2 is an isometric drawing of an embodiment of a manufacturing system for fabricating a three-dimensional article.

FIG. 2 is an isometric drawing of an embodiment of the manufacturing system 2. System 2 includes a door 44 shown in an open configuration for which the process chamber 8 is exposed to an outside atmosphere. With the open configuration, an RPM 10 can be loaded into or unloaded out of housing 6. In the closed configuration the door 44 closes opening 46 in housing 6 and then seals the process chamber 8 from the outside atmosphere. In the illustrated embodiment, the controller 42 is configured to operate an automatic locking and unlocking system for the door 44.

In describing system 2, mutually orthogonal axes X, Y and Z can be used. Axes X and Y are lateral axes that are generally horizontal. Axis X is a direction that the coater 28 scans as it deposits powder upon an upper surface 22 of the platen 20 or an upper surface 23 of the three-dimensional article 4 being formed. The coater 28 has a major axis that is parallel to the Y-axis. The Z-axis is vertical and generally aligned with a gravitational reference. The term "generally" is by design and accurate to within manufacturing tolerances.

Figure 3:
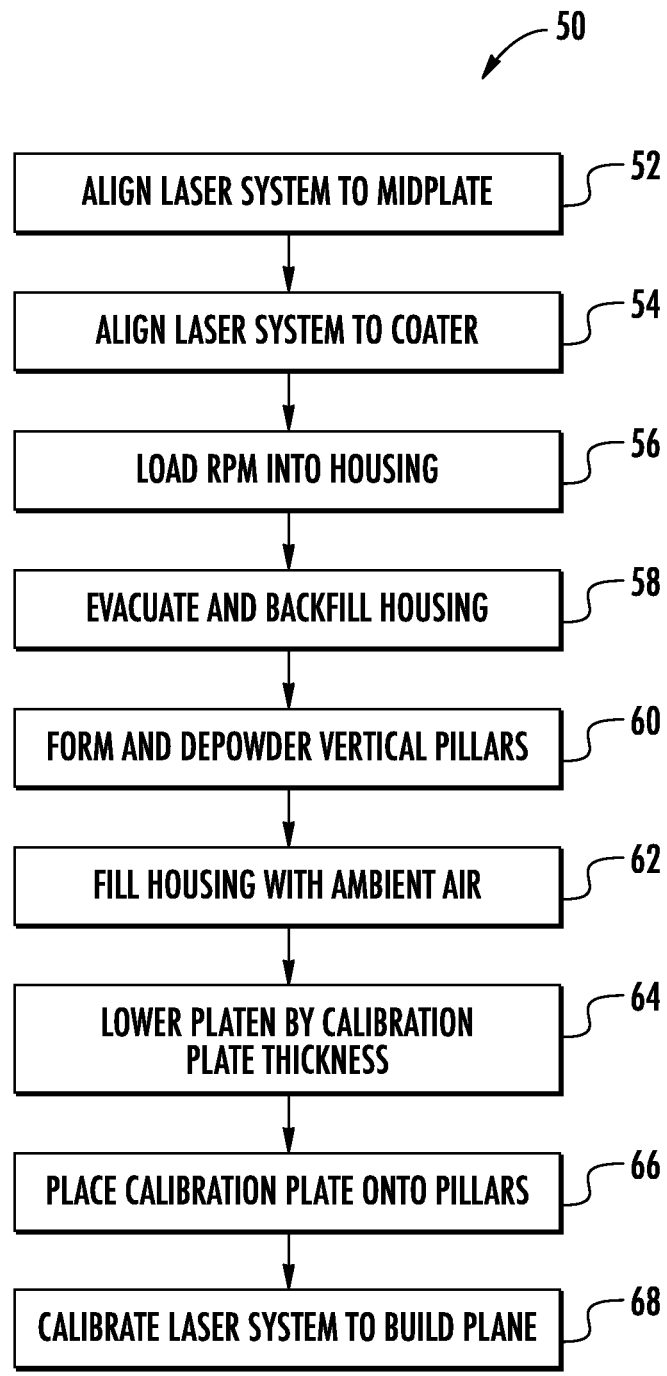
FIG. 3 is a flowchart depicting an embodiment of a method of calibrating a manufacturing system.

FIG. 3 is an embodiment of a method 50 of calibrating the laser system 34 to the build plane 38. According to 52, the laser system 38 is mechanically aligned to the midplate 26. Laser system 38 includes a scanner that is located in a scanner housing above but fluidically isolated from the process chamber 8. The scanner housing is mechanically aligned to the midplate 26. According to 54, the laser system 38 is mechanically aligned to the coater 28 along an X axis.

According to 56 the RPM is loaded into the process chamber 8 of housing 6. Loading the RPM into the housing 6 causes a vertical movement actuator 21 within the housing to be coupled to the platen 20. As part of the loading, the door 44 is moved from an open to a closed position and locked. According to 58, the gas handling system 24 is activated to evacuate (apply a vacuum to eliminate ambient air) the process chamber 8 and then to backfill the process chamber 8 with argon.

Figure 3A:
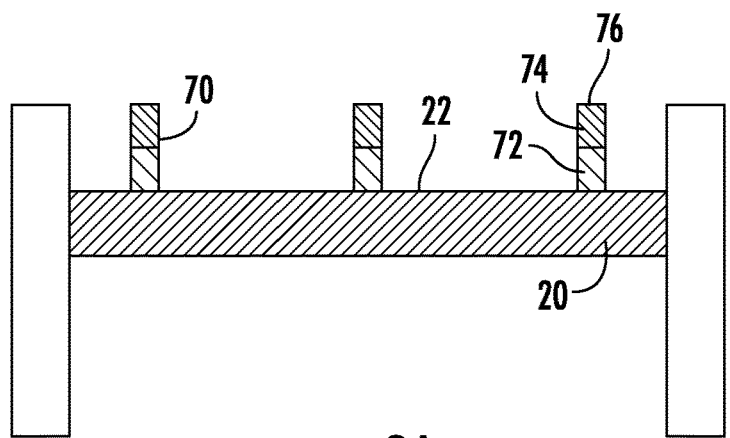
FIG. 3A is a schematic illustration of step 60 of FIG. 3.
Figure 3B:
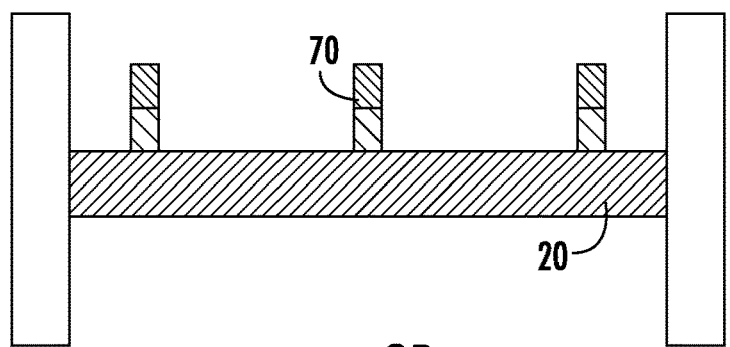
FIG. 3B is a schematic illustration of step 64 of FIG. 3.
Figure 3C:
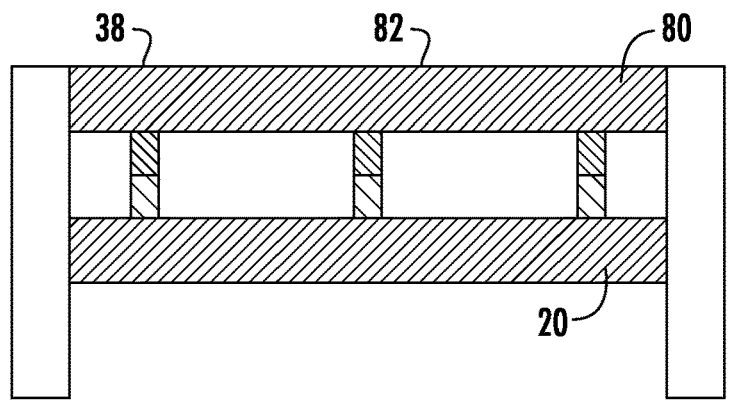
FIG. 3C is a schematic illustration of step 66 of FIG. 3.

Steps 60, 64, and 66 correspond to FIGS. 3A, 3B, and 3C respectively. According to 60, at least three vertical pillars 70 are formed onto the upper surface 22 of platen 20. The method of forming the vertical pillars 70 has already been discussed with respect to FIG. 1 (as forming a three-dimensional article 4) as the controller 42 operates the vertical movement actuator 21, coater 28, and laser system 34 to fuse the pillars 70. As illustrated in FIG. 3A, the pillars 70 individually include a lower density portion 72 in contact with the upper surface of platen 20. The pillars individually have an upper higher density portion 74 that defines an upper surface 76. In an illustrative embodiment, the lower density portion has a density of about 70% metal and 30% void space (30% porosity) whereas the higher density portion 74 is more than 95% metal (less than 5% porosity). The lower density portion 72 allows the pillar to be removed more easily from the upper surface 22 so that the platen 20 can later be used for fabricating three-dimensional articles 4 once calibration is complete. Also according to 60, powder is removed from above the platen 20.

According to 62, the gas handling system 24 is operated to fill the process chamber 8 with ambient air. Also according to 62, the door 44 is unlocked to provide access to the process chamber 8.

According to 64, vertical movement actuator 21 is activated to lower the platen by a distance D which is a thickness of calibration plate 80. This is illustrated in FIG. 3B. According to 66, the calibration plate 80 is placed upon the upper surfaces 76 of pillars 70. This is illustrated in FIG. 3C. An upper surface 82 of the calibration plate 80 is then coincident with the build plane 38.

Figure 5:
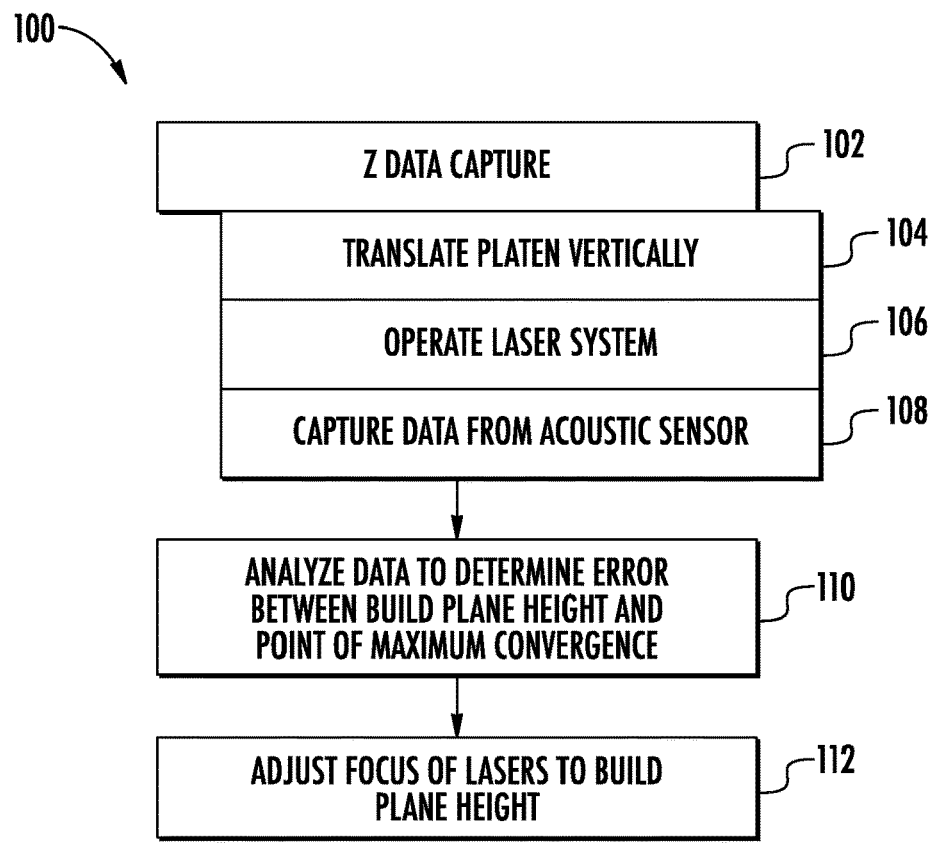
FIG. 5 is a flowchart depicting an embodiment of the calibration step 68 of FIG. 3.

According to 68, the laser system 34 is calibrated using sensors 40 and 41 and calibration plate 80. FIGS. 5 and 6 illustrate calibration methods 90 and 100 respectively. Step 68 of FIG. 3 can include one or both of methods 90 and 100.

The formation of pillars 70 for holding the calibration plate 80 is important. When the RPM 10 is loaded into housing 6, the platen 20 is then positioned within the process chamber 8. Due to mechanical tolerances of loading the RPM 10 and within the RPM 10 itself, the upper surface 22 of the platen can vary in height and orientation. On the other hand, the upper surfaces 76 of pillars 70 depend upon mechanical accuracy of the midplate 26 and coater 28 which define the build plane 38. Therefore, the system remains calibrated when a new RPM 10 is placed into the housing 6. Therefore, this method of calibration reduces cost (no need to calibrate for every RPM replacement) and improves accuracy over systems that rely on the upper surface 22 of a platen 20 for calibration.

In an alternative embodiment, there is no midplate 26 and the coater 28 is an integral part of the RPM. For such a system, parts of the method 50 can still be performed. In particular, steps 56-68 can still be performed for such an embodiment each time a new RPM is loaded. In yet other embodiments, there is no RPM. Then steps 58-68 can be used for calibration.

Figure 4:
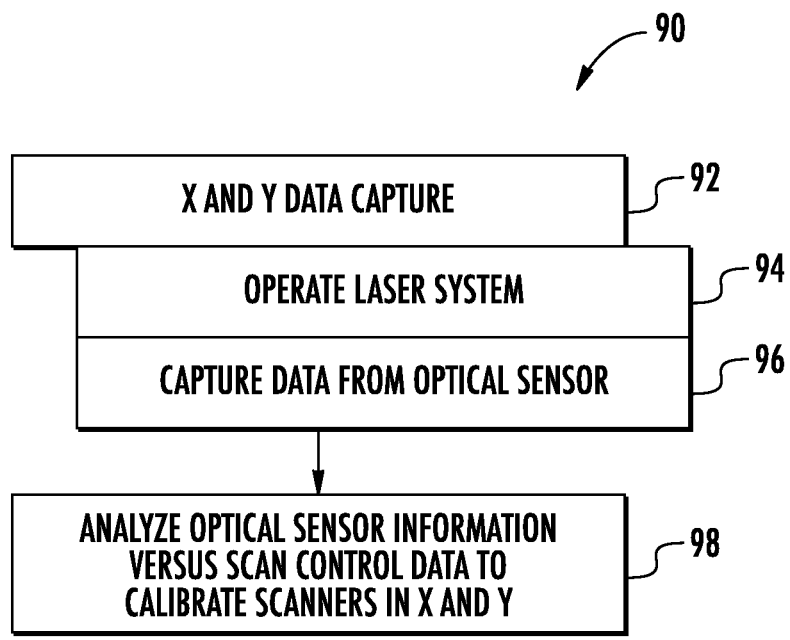
FIG. 4 is a flowchart depicting an embodiment of the calibration step 68 of FIG. 3.
Figure 4A:
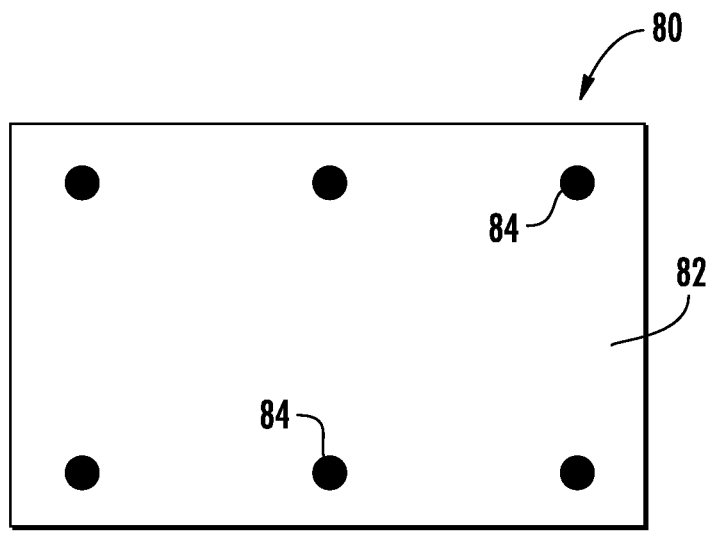
FIG. 4A is a top view of an embodiment of a calibration plate.

FIG. 4 is an embodiment of a calibration process for aligning the laser system 34 scanning optics to the build plane 38 along X and Y using optical sensor 40. According to 92, X and Y data is captured during two concurrent operations 94 and 96. According to 94, the laser system 34 is operated to scan a radiation beam 36 across the upper surface 82 of calibration plate 80. A top view of an embodiment of calibration plate 80 is illustrated in FIG. 4A. Calibration plate 80 includes an array of alignment targets 84 which can be openings or holes passing through the calibration plate 80. Locations of the targets 84 are precisely known in relation to the calibration plate 80 aforehand. According to 96, optical sensor 40 outputs a data stream or signal that is indicative of radiation reflected up from the calibration plate 80. According to 98, information derived from the optical signal is compared to control parameters for the scanners of the laser system 34 to calibrate the scanners in X and Y. In particular, the reflected radiation correlated with scanner coordinates identifies measured X and Y locations of the targets 84. These are compared with known or "expected" target 84 locations of the calibration plate 80. A comparison of measured and expected coordinates the of targets 84 is used to calibrate the scanners in X and Y. Thus, the laser system 34 is calibrated in X and Y.

Figure 5A:
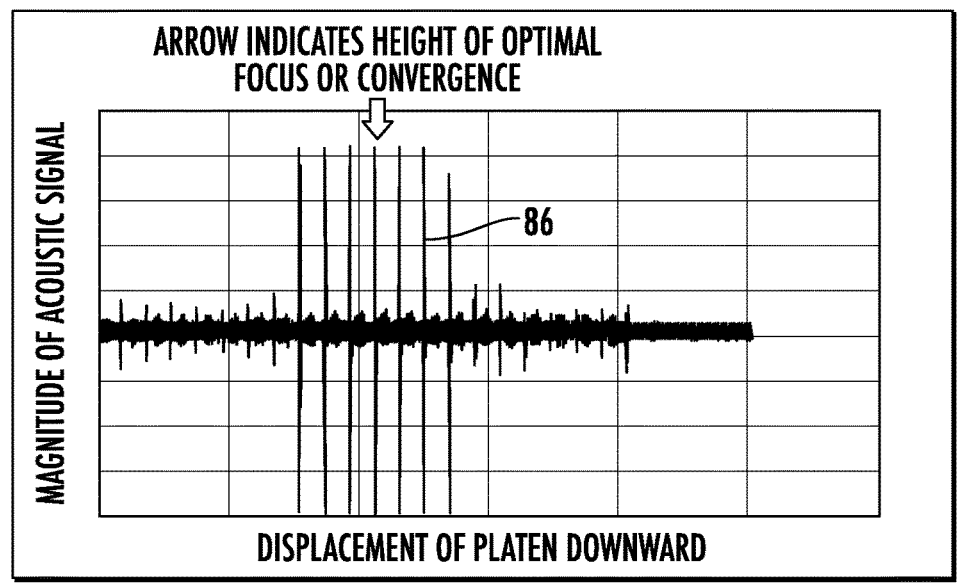
FIG. 5A is a graphical illustration of a signal generated by an acoustic sensor.

FIG. 5 is an embodiment of a calibration process for aligning the laser system 34 to the build plane along the vertical axis Z using acoustic sensor 41. According to 102, data is captured during concurrent processes 104, 106, and 108. According to 104, the platen 20 is translated vertically. According to 106, the laser system 34 is activated to impact the upper surface 82 with radiation beam pulses (see FIG. 5A with acoustic signals corresponding to the laser pulses). According to 108, a signal is captured from the acoustic sensor 41. The signal from the sensor 41 versus a height of the surface 82 is illustrated in FIG. 5A. The stronger acoustic signals 86 are generated when surface 82 is closest to a focal point of the radiation beam 36 as illustrated in FIG. 5A. An arrow in FIG. 5A, in the middle of the strong signals, corresponds to the center of the focus. A displacement of the surface 82 from the build plane 38 corresponding to the arrow is a focusing error according to step 110. After the analysis of step 110 is performed, the laser system 34 focus is adjusted to align with the build plane 38 in step 112.

The specific embodiments and applications thereof described above are for illustrative purposes only and do not preclude modifications and variations encompassed by the scope of the following claims. Modifications and variations can include different imaging systems (e.g., particle beams, electron beams, lasers, spatial light modulators, to name a few) and materials (polymers, metals, ceramics, liquids, powders, wires, filaments, to name a few). Different imaging systems and/or materials can be used individually or in varying combinations.

What is claimed:

1. A method of operating a manufacturing system which includes a housing, a coater, a vertical movement actuator coupled to a platen of a removable powder module installed in the housing, and a laser system, the method comprising:
operating the vertical movement actuator, the coater, and the laser system to form at least three pillars onto an upper surface of the platen by selectively fusing powder material, the at least three pillars having upper surfaces that collectively define a plane;
operating the vertical movement actuator to position the upper surfaces of the at least three pillars at a distance D below a build plane;
placing a calibration plate of a thickness corresponding to the distance D on top of the upper surfaces of the at least three pillars; and
calibrating the laser system by steps of:
operating the laser system to impact the upper surface of the calibration plate with a radiation beam;
operating a sensor concurrently with operating the laser system to impact the upper surface of the calibration plate;
receiving and analyzing a signal from the sensor; and
calibrating the laser system with respect to the build plane based on the analyzed signal,
wherein the laser system is configured to remain calibrated even when the removable powder module is replaced.

2. The method of claim 1 further comprising loading the removable powder module into the housing, the removable powder module including the platen and containing powder, and the vertical movement actuator being coupled to the platen when the removable powder module is loaded into the housing.

3. The method of claim 1 wherein the manufacturing system includes a midplate and further comprising mechanically aligning the laser system to the midplate.

4. The method of claim 3 further comprising mechanically aligning the laser system to the coater.

5. The method of claim 1 wherein the at least three pillars individually include a lower portion having a lower density in contact with the platen and an upper portion having a higher density that defines the upper surface thereof.

6. The method of claim 1 further comprising: after forming the at least three pillars, removing powder from above the platen before placing the calibration plate.

7. The method of claim 1 further comprising: evacuating the housing and then backfilling the housing with argon before forming the at least three pillars.

8. The method of claim 1 wherein calibrating the laser system is performed with ambient air inside the housing.

9. The method of claim 1 wherein the sensor is an optical sensor, the calibration plate includes fiducial marks, and analyzing the signal includes comparing an estimated location of the fiducial marks with scan coordinates of the fiducial marks obtained by the optical sensor.

10. The method of claim 1 wherein the sensor is an acoustic sensor and the method further includes:
vertically translating the calibration plate concurrent with operating the laser system to impact the upper surface of the calibration plate;
identifying peaks in an acoustic signal obtained by the acoustic sensor;
analyzing the peaks to determine a focus height of the laser;
comparing the focus height with a height of the build plane to provide an error; and
adjusting the laser system based upon the error so that the focus height better coincides with the build plane height.

11. A manufacturing system comprising:
a housing defining a build chamber;
a sensor in the build chamber;
a coater that translates along an axis and configured to deposit a layer of powder having an upper powder surface defining a build plane;
a removable powder module installed in the housing, the removable powder module comprising a powder supply that is coupled to the coater and a motorized platen having an upper platen surface;
a laser system; and
a controller configured to:
operate the motorized platen, the coater, and the laser system to form at least three pillars upon the upper platen surface by selectively fusing powder material, the at least three pillars having top surfaces that collectively define a plane;
operate the motorized platen to position top surfaces of the at least three pillars at a distance D below the build plane;
unlock the housing and placing a calibration plate of a thickness corresponding to the distance D upon the top surfaces of the at least three pillars so that a top surface of the calibration plate is positioned at the build plane;
concurrently operate at least the laser system to impact the upper surface of the calibration plate and the sensor;
analyze a signal from the sensor; and
calibrate the laser system based on the analyzed signal,
wherein the laser system is configured to remain calibrated even when the removable powder module is replaced.

12. The manufacturing system of claim 11 wherein the controller is further configured to, before forming the at least three pillars, operate a gas handling system to evacuate the build chamber and then backfill the build chamber with argon.

13. The manufacturing system of claim 12 wherein the controller is further configured to, after forming the at least three pillars, operate the gas handling system to fill the build chamber with ambient air.

14. The manufacturing system of claim 11 wherein the sensor is an optical sensor, the calibration plate includes a plurality of fiducials, concurrently operating at least the laser system includes scanning a radiation beam emitted by the laser system over the fiducials, and analyzing a signal from the sensor includes comparing expected locations of the fiducials with scan coordinates of the fiducials obtained by the optical sensor.

15. The manufacturing system of claim 11 wherein the sensor is an acoustic sensor and:
concurrently operating at least the laser system and the sensor includes concurrently vertically translating the calibration plate;
analyzing a signal from the sensor includes identifying peaks in an acoustic signal obtained by the acoustic sensor, analyzing the peaks to determine a focus height of the laser, comparing the focus height with a height of the build plane to provide an error, and adjusting the laser system based upon the error so that the focus height better coincides with the build plane height.

16. The manufacturing system of claim 11 wherein the sensor is one of two sensors including an optical sensor and an acoustic sensor, and wherein analyzing a signal includes:
 calibrating the laser system along lateral axes X and Y at least partly as a result of analyzing a signal from the optical sensor; and
 calibrating the laser system along vertical axis Z at least partly as a result of analyzing a signal from the acoustic sensor.

\* \* \* \* \*